Patented Mar. 15, 1938

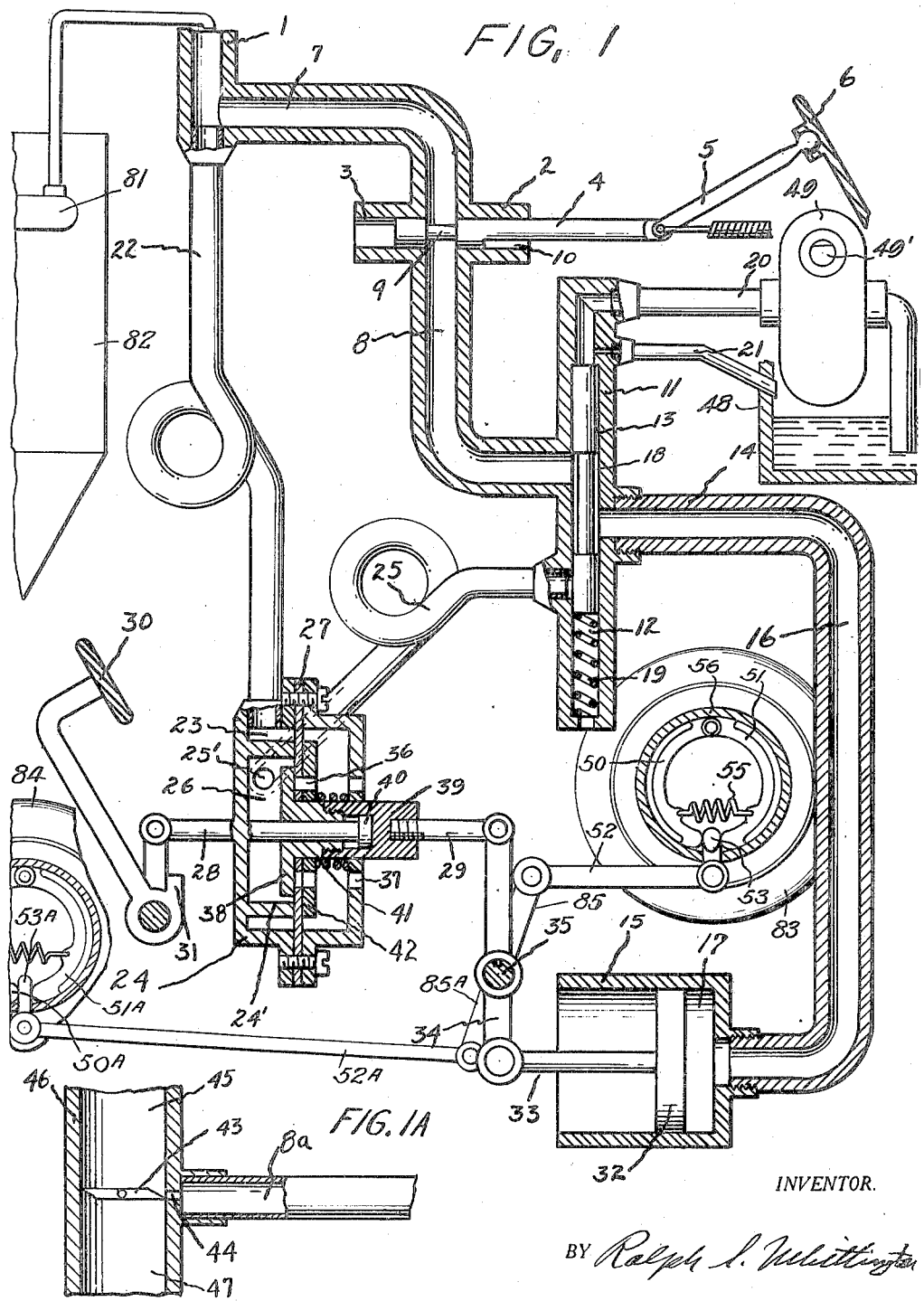

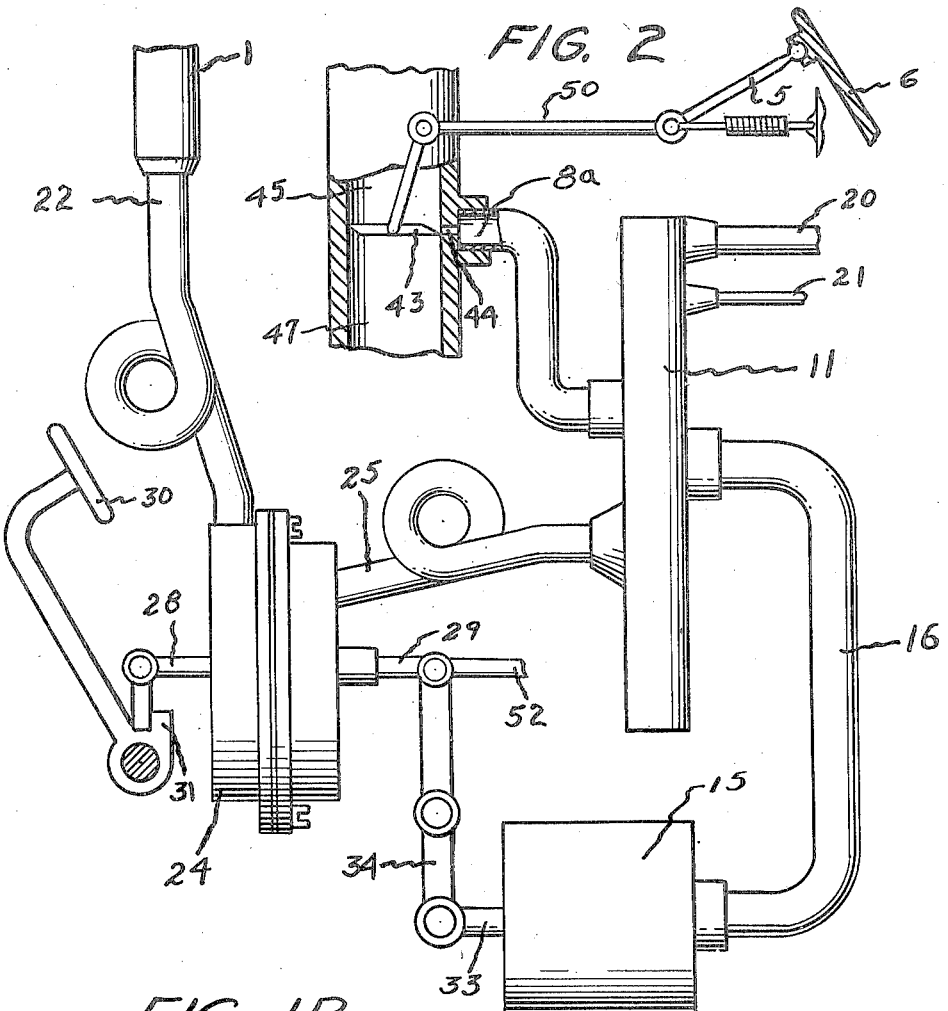
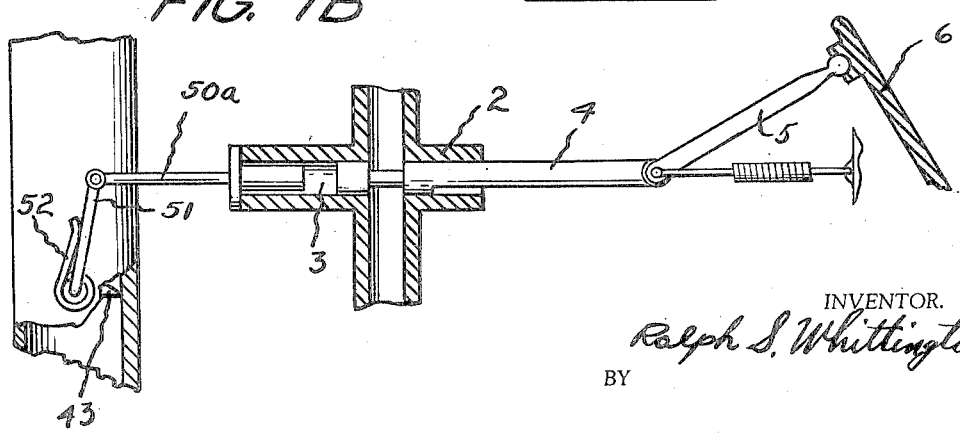

2,111,305

UNITED STATES PATENT OFFICE 2,111,305

AUTOMATIC CONTROL OF THE BRAKES OF A MOTOR VEHICLE

Ralph S. Whittington, Boston, Mass., assignor to Bendix Products Corporation, South Bend, Ind., a corporation of Indiana

REISSUED

NOV 26 1940

Application August 31, 1932, Serial No. 631,208
Renewed April 22, 1937

16 Claims. (Cl. 192—3)

This invention relates to an automatic means of applying the brakes of an automotive vehicle by the use of intake manifold vacuum.

The primary object of this invention is to provide a means of automatically holding the brakes of an automotive vehicle on after the vehicle has completely stopped and the accelerator is completely released as the motor idles.

Fig. 1 is a semi-diagrammatic view partly in section of a control means constructed in accordance with this invention.

Fig. 1A is a fragmentary sectional view illustrating a variation adaptable to the system shown in Fig. 1.

Fig. 1B is a fragmentary view partly in section showing the method of connecting the carburetor throttle valve to the system of Fig. 1.

Fig. 2 is a semi-diagrammatic view partly in section showing how the device of Fig. 1A is adapted to the system of Fig. 1.

In general this invention provides a vacuum operated power unit operable to apply the brakes of the vehicle and controlled by means controlling the acceleration of the motor and by the motion of the vehicle, so that vacuum from the intake manifold holds the brakes of the vehicle on as soon as the vehicle stops with the accelerator released. This eliminates the necessity of manually holding the brakes on as is the case when the vehicle is stopped on an incline to wait for traffic, stop signals, etc.

Such a device is readily adapted to a vehicle equipped with a vacuum power brake or booster brake, and more vehicles are being thusly equipped each year. Also, where the transmission of the vehicle is equipped with force feed lubrication, this system is more readily adapted.

Referring then to the drawings, there is shown in Fig. 1 a system composed of the conduit 1 adapted to be connected to the intake manifold 81 of a motor 82 of a vehicle with which the system is associated. Conduit 1 is provided with the extension 2 which contains the bore 3. Bore 3 slidably receives plunger 4 which is connected by a suitable linkage 5 to the accelerator pedal 6. A spring 6ª is provided for returning the accelerator pedal 6. Plunger 4 divides conduit 1 into passages 7 and 8, and controls communication between passages 7 and 8 and between passage 8 and the atmosphere by virtue of the reduced portion 9 of the plunger 4 and groove 10 in plunger 4. Conduit 1 terminates in the extension 11 which contains the bore 12, and bore 12 slidably receives the piston 13. Into extension 11 is tapped the conduit 14, which at its other end is tapped into the power cylinder 15, providing the passage 16 communicating with bore 12 of the extension 11 and the chamber 17 of the power cylinder 15. The valve 13, by virtue of the reduced portion 18, controls communication between passages 8 and 16.

Valve 13 is actuated by spring 19 and by pressure applied thru the conduit 20 tapped into extension 11. Conduit 21 is tapped into the extension 11 and forms a passage from the bore 12 to the reservoir 48 or intake of the pump 49 supplying pressure through the conduit 20. Pump shaft 49' is adapted to be driven by the motion of the vehicle. Conduit 22 provides a passage from passage 7 to the chamber 23 of the brake valve 24, and conduit 25 provides a passage from the bore 12 of extension 11 to chamber 26 of brake valve 24 thru the port 25'. Diaphragm 27 controls communication between the chambers 23 and 26 of brake valve 24, and is actuated by tension in brake rods 28 and 29, and by vacuum. Brake pedal 30, by virtue of lug 31, is arranged to place tension in pull rod 28 and pull rod 28 is rigidly attached to the valve body 24.

Power cylinder 15 slidably receives the piston 32, which is connected by piston rod 33 to lever 34. Lever 34 controls the main brake cross shaft 35 which actuates the brakes 50 and 51 and 50ª and 51ª associated respectively with the road wheels 83 and 84 of the vehicle by means of the levers 85 and 85ª, the links 52 and 52ª, and the cams 53 and 53ª respectively. An opposite extension of the lever 34 also actuates the rod 29 connected to the brake valve 24.

Ports 36 and 37 form an atmospheric connection from chamber 26 of the brake valve 24, controlled by the disk 38 tapped into the end of the member 39. The end of pull rod 28 is provided with the enlarged portion 40 which slides in member 39 to limit the motion of diaphragm 27. Spring 41 acts to hold disk 38 and disk 42 in contact with diaphragm 27.

In the operation of the system, vacuum from the intake manifold is present in passage 7 while the motor of the vehicle is operating, and while the accelerator is released vacuum can act past plunger 4, by virtue of the reduced portion 9 of plunger 4, to the passage 8.

While the vehicle is in motion, pressure from the transmission lubricating system, or any pump 49 driven by the motion of the vehicle, acts in conduit 20 to move valve 13 to compress spring 19, thereby closing passage 8 from bore 12, and opening bore 12 to conduit 25. But as soon as the vehicle comes to a stop, spring 19 moves valve 13 to the position shown in Fig. 1 thereby opening passage 8 to passage 16 by virtue of reduced portion 18 of valve 13. The relief passage provided thru the conduit 21 to the transmission pump reservoir 48 insures that spring 19 can readily move valve 13, but this passage is too small to interfere with the transmisison pump in maintaining a pressure in conduit 20.

In making a normal stop, that is depressing the brake pedal 30 with the accelerator released, this invention does not interefere in any way with normal action of the braking system. This is true regardless of the position of the accelerator, since as long as the vehicle is moving, pressure will hold the valve 13 down to close passage 8 from passage 16, and open passage 16 to passage 25 so that vacuum will be admitted to the power cylinder 17 only thru the operation of the brake pedal 30 and the valve 24.

Thus as soon as the vehicle stops, vacuum from the intake manifold can act directly to the chamber 17 of the power cylinder 15, allowing atmospheric pressure to move piston 32 to the position shown in Fig. 1. Thus the pull rod 33 acts on the lever 34 and rotates the main brake cross shaft 35, thereby applying the brakes 50 and 51 of the vehicle. The brakes will remain on (while the motor is idling) until the accelerator pedal 6 is depressed. This action will shut off vacuum in passage 8, and open it to the atmosphere thru groove 10 of plunger 4 before the motor is accelerated. Atmospheric pressure will then exist in chamber 17 of power cylinder 15, and piston 32 will be returned to its normal position by the brake return springs 55 thereby releasing the brakes 50 and 51. As soon as the vehicle is in motion again, pressure will exist in conduit 20, compressing spring 19 again, closing passage 8 from passage 16, and opening passage 16 to conduit 25, making possible the normal use of the manually operated vacuum booster brake. The automatic brake system just described would ordinarily be associated with a vacuum booster brake system, as is illustrated in Fig. 1. This particular system is merely shown as an example, and it is obvious that any system using a vacuum operated power unit could be adapted to the above outlined system.

In the operation of this particular system, vacuum from the engine intake system acts thru conduit 22 to the chamber 23 of the brake valve 24. When the brake pedal 30 is depressed, lug 31 acts to place a tension in pull rods 28 and 29, thus starting the manual operation of the brake by rotating the main brake cross shaft 35. This also moves diaphragm 27 from its contact on the circular rib 24' by compressing spring 41, thereby opening chamber 26 to chamber 23. This opening is effected by the relative motion of valve housing 24 with rod 28 away from rod 29. Thus intake manifold vacuum is transferred to chamber 26 and thru port 25', thru conduit 25, thru valve 13 and passage 16 to chamber 17 of power cylinder 15, thereby allowing vacuum to further apply the brakes. However, as vacuum appears in chamber 26 of brake valve 24, atmospheric pressure acts thru ports 36 and 37 of brake valve 24, tending to move diaphragm 27 against the circular rib 24'. The disk 42 urged also by spring 41 assists in closing the chamber 26 from the chamber 23. This will happen when the vacuum in chamber 26 reaches the correct figure in relation to the pedal pressure exerted on brake pedal 30, since the motion of piston 32 of power cylinder 15, as the brakes are applied, moves the member 39 forward to allow the closing of the chamber 26 by the diaphragm 27. Thus as the brake is applied more by manual pressure, vacuum will assist in applying the brakes in a corresponding ratio.

The enlarged portion 40 of pull rod 28 allows the diaphragm 27 to move only a fixed distance, and carries the force exerted on the brake pedal 30 in excess of the force of spring 41 and atmospheric pressure acting on the diaphragm 27.

When the brake pedal is released, atmospheric pressure acting thru the ports 36 and 37, forces disk 38 away from diaphragm 27, allowing air to enter chamber 26 of the brake valve 24, thereby releasing the vacuum in the chamber 17 of the power cylinder 15, thus completely releasing the brakes.

This must happen since, when the brake pedal 30 is released the rod 28 has no tension in it and the valve body 24 will not be urged forward. Hence no pressure can exist between the surface of disk 38 and the diaphragm 27, and for this reason atmospheric pressure will have free communication with the chamber 26 through the ports 36.

Fig. 1B shows how the carburetor throttle valve 43 is operated by the accelerator pedal 6 of Fig. 1. After some pre-determined motion of the pedal 6 and the valve 4, the valve 4 contacts the throttle valve control rod 50a which, by means of the arm 51, opens the throttle valve 43. It is desirable to have a certain lag between the motion of the pedal 6 and valve 4 as related to the throttle valve 43 in order that the valve 4 can effect a release of the brakes before the throttle valve 43 is opened. The spring 52 urges the throttle valve toward closed position.

Fig. 1A illustrates a method of eliminating the plunger 4 shown in Fig. 1. Here the carburetor throttle valve 43 acts as the means controlling communication between the intake system and the passage 8 of Fig. 1, and between the passage 8 and the atmosphere. Port 44 is subject to the vacuum in passage 45 of the carburetor riser 46 when the throttle valve 43 is closed, and to atmosphere in passage 47 when the throttle valve 43 is opened. Thus passage 8a is subject to vacuum when the motor idles, and to atmospheric pressure as the throttle valve 43 is actuated. Passage 8a is adapted to be connected to the bore 12 in Fig. 1 in the same manner as the passage 8 shown in Fig. 1. The port 44 in carburetor riser 46 should preferably be rectangular in shape or formed to have the maximum area and require the minimum motion of throttle valve 43 to expose it to atmospheric pressure.

In Fig. 2 the manner in which the device of Fig. 1A is adapted to the system of Fig. 1 is illustrated. The passage of the conduit 22 connects directly to the passage formed by the conduit 1 as in Fig. 1. The passage formed by the conduit 8a from the valve body 11 leads to the port 44 formed in the carburetor riser 46 at a point just above the throttle valve 43 that is exposed to vacuum in the intake manifold until the valve 43 is partially opened. Then the port 44 will be exposed to atmospheric pressure by the upward motion of the edge of valve 43 that is adjacent to the port 44. The conduit 8a replaces the passage 8 of Fig. 1 and the throttle valve is used to replace the valve 4 of Fig. 1. The conduit 8a is exposed to vacuum when the throttle valve is closed, and to atmospheric pressure when the throttle valve 43 is opened to any degree, and the above substitution does not affect the operation of the system.

While the invention has been described in some detail, it is to be understood that the description is for the purpose of illustration only and is not to be construed as definitive of the limits of the inventive idea. The right is reserved to make such changes in the details of construction and arrangement of parts as will fall within the purview of the following claims.

What I claim as my invention is:

1. In a system of the class described, an automotive vehicle having brakes and a motor with an intake system, means for controlling the acceleration of said motor, a pressure responsive member for applying said brakes, means providing a passage from the intake system of said motor to said member, means operating upon release of the means for controlling the acceleration of the motor to open said passage whereby vacuum actuates said member to apply said brakes, and operating upon the actuation of said acceleration control mechanism to close said passage from the intake system and open said passage to the atmosphere whereby said brakes are released, and means operating at the initial motion of said vehicle to close said passage from the intake system.

2. In a system of the class described, an automotive vehicle having brakes, a vacuum power brake system and a motor with an intake system, means for controlling the acceleration of the motor, means providing a passage between the intake system of the motor and the pressure responsive member of said power brake system for applying said brakes, means operating upon release of the means for controlling the acceleration of the motor to open said passage whereby vacuum actuates said member to apply said brakes, and operating upon the actuation of said acceleration control mechanism to close said passage from the intake system and open said passage to the atmosphere whereby said brakes are released, and means operating at the initial motion of said vehicle to close said passage from the intake system.

3. In a system of the class described, an automotive vehicle having brakes, a motor with an intake system, and a transmission lubricating pump, a pressure responsive member for applying said brakes, means for controlling the acceleration of said motor, means providing a passage from the intake system of the motor to said member, means operating upon release of the means for controlling the acceleration of the motor to open said passage whereby vacuum actuates said member to apply said brakes, and operating upon the actuation of said acceleration mechanism to close said passage from the intake system and open said passage to the atmosphere whereby said brakes are released, means whereby said transmission lubricating pump is operative at the initial motion of said vehicle to close said passage from the intake system.

4. In a system of the class described, an automotive vehicle having a motor and brakes, means controlling the acceleration of the motor of said vehicle, a source of vacuum, a pressure responsive member operative to apply the brakes of said vehicle, means providing a passage between said member and said pressure source, means operating upon release of the means controlling the acceleration of the motor to open said passage to the source of differential pressure and operating on the actuation of said acceleration control mechanism to close said passage from said pressure source and open said passage to atmosphere, and means operative at the initial motion of said vehicle to close said passage from said source of pressure and operative to open said passage to said source of pressure when said vehicle stops.

5. In a system of the class described, an automotive vehicle having a motor and brakes, means controlling the acceleration of said motor, a source of vacuum, a pressure responsive member operative to apply the brakes of said vehicle, means providing a passage between said member and said pressure source, means operative when said acceleration control mechanism is released to open said passage to the source of differential pressure and operative on the actuation of said acceleration control mechanism, to close said passage from said pressure source whereby said brakes are released, and means operative when said vehicle is put in motion to close said passage from said source of pressure and operative to open said passage to said pressure source when said vehicle stops.

6. In a system of the class described, an automotive vehicle having brakes and a motor with an intake system, means for controlling the acceleration of said motor, a pressure responsive member for applying said brakes, means providing a passage from the intake system of said motor to said pressure responsive member, a valve operable by said acceleration control mechanism to control communication between said passage and the intake system, and between said passage and the atmosphere, means operating upon release of the acceleration control mechanism to actuate said valve to open said passage to the intake system and operating upon the actuation of said acceleration control mechanism to actuate said valve to close said passage from the intake system and open said passage to atmosphere whereby said brakes are released, means operable by the pressure generated by the motion of said vehicle and controlling communication between the intake system and said member, aforesaid means operable by pressure being further operative at the initial motion of said vehicle to close said passage from the intake system, and open said passage to the intake system when said vehicle stops.

7. In a system of the class described, an automotive vehicle having brakes and a motor with an intake system, means for controlling the acceleration of said motor, a pressure responsive member for applying said brakes, means providing the passage from the intake system of said motor to said member, a valve operable by said acceleration control mechanism to control communication between said passage and the intake system and between said passage and the atmosphere, means operating upon release of the acceleration control mechanism to actuate said valve to open said passage to the intake system and operating upon the actuation of said acceleration control mechanism to actuate said valve to close said passage from the intake system and open said passage to atmosphere whereby said brakes are released, a second valve operable by pressure generated by the motion of said vehicle and controlling communication between the intake system and said member whereby at the initial motion of said vehicle said passage between said member and the intake system is closed, resilient means operable to actuate said second valve to open said passage to the intake system when said vehicle stops whereby said brakes are applied, and a pressure relief passage, said relief passage forming an exit for the fluid displaced by said second valve whereby said resilient means actuates said second valve.

8. In a system of the class described, an automotive vehicle having brakes and a motor with an intake system including a carburetor riser with a throttle valve therein, a pressure responsive member for applying said brakes, a port in said carburetor riser, said port being subject to vacuum in the carburetor riser when the motor is idling and subject to atmospheric pressure when the throttle valve is open, means providing a passage between said port and said member, a second valve operable by pressure generated by the motion of said vehicle and controlling communication between said port and said member whereby said second valve is actuated to close said passage from said port at the initial motion of the vehicle, resilient means operable to actuate said second valve to open said passage to said port when said vehicle stops whereby said brakes are applied.

9. In a system of the class described, an automotive vehicle having brakes and a motor with an intake system including a carburetor riser with a throttle valve therein, a pressure responsive member for applying said brakes, a port in said carburetor riser, said port being subject to vacuum in the carburetor riser when the motor is idling and subject to atmospheric pressure when said throttle valve is opened, means providing a passage between said port and said member, a second valve operable by pressure generated by the motion of said vehicle and controlling communication between said port and said member whereby said second valve is actuated to close said passage from said port at the initial motion of said vehicle, resilient means operable to actuate said second valve to open said passage to said port when said vehicle stops whereby said brakes are applied, means whereby fluid pressure actuating said second valve is relieved resulting in the free action of said resilient means.

10. In a system of the class described, an automotive vehicle having brakes with a vacuum power brake system including a pressure responsive member for applying the vehicle brakes, a control means for admitting vacuum to said member, a motor with an intake system, means for controlling the acceleration of said motor, means providing a passage between the intake system and the pressure responsive member of said power brake system, a valve operable by said acceleration control mechanism to control communication between said passage and the intake system and between said passage and the atmosphere, a second valve operable by pressure generated by the motion of said vehicle and controlling communication of said passage with said member and also controlling a second passage with said member whereby said second valve is actuated to close said passage from the intake system and open said second passage, said second passage being operative on the actuation of said brakes to admit vacuum to said member to apply said brakes, means operating upon release of the acceleration control mechanism to actuate said valve to open said passage to the intake system and operating upon the actuation of said acceleration control mechanism to actuate said valve to close said passage from the intake system and open said passage to the atmosphere whereby said brakes are released, resilient means operable to actuate said second valve to open said passage to the intake system when said vehicle stops whereby said brakes are applied.

11. In a system of the class described, an automotive vehicle having brakes with a vacuum power brake system including a pressure responsive member for applying the vehicle brakes, a control means for admitting vacuum to said member, a motor with an intake system means for controlling the acceleration of said motor, means providing a passage between the intake system and the pressure responsive member of said power brake system, a valve operable by said acceleration control mechanism to control communication between said passage and the intake system and between said passage and the atmosphere, means operating upon release of the acceleration control mechanism to actuate said valve to open said passage to the intake system and operating on the actuation of said acceleration control mechanism to close said passage from the intake system and open said passage to the atmosphere whereby said brakes are released, a second valve operable by pressure generated by the motion of said vehicle and controlling communication of said passage with said member and also controlling communication of a second passage between said vacuum brake control means and said member whereby said second valve is actuated to close said passage from the intake system and open said second passage, said second passage being operative on the actuation of said control means to admit vacuum to said member for applying said brakes, resilient means operable to actuate said second valve to open said passage to the intake system when said vehicle stops whereby said brakes are held applied.

12. In a system of the class described, an automotive vehicle having brakes with a vacuum power brake system including a pressure responsive member for applying the vehicle brakes, a control means for admitting vacuum to said member, and a motor with an intake system including a carburetor riser with a throttle valve therein, means for actuating said throttle valve, a port in said carburetor riser, said port being subject to vacuum in the carburetor riser when the motor is idling and subject to atmospheric pressure when said throttle valve is opened, means providing a passage between said port and the pressure responsive member of said power brake system, a second valve operable by pressure generated by the motion of said vehicle and controlling communication between said port and said member whereby said second valve is actuated to close said passage from said port and open a second passage on the initial motion of said vehicle, said second passage being operative on the actuation of the control means of said power brake system to admit vacuum to said member and apply said brakes, resilient means operable to actuate said second valve to open said passage to said port when said vehicle stops whereby the brakes are held applied.

13. In a system of the class described, an automotive vehicle having brakes with a vacuum power brake system including a pressure responsive member for applying the vehicle brakes, a control means for admitting vacuum to said member, a motor with an intake system including a carburetor riser with a throttle valve therein, means for controlling the actuation of said throttle valve, a port in said carburetor riser, said port being subject to vacuum in said carburetor riser when the motor is idling and subject to atmospheric pressure when said throttle valve is open, means providing a passage between said port and the pressure responsive member of said power brake system, a second passage providing communication between the intake system and said pressure responsive member through the medium of aforesaid vacuum brake control means, a second valve operable by pressure generated by the motion of said vehicle and controlling communication between said port and said member whereby said second valve is actuated to close said passage from said port and open said second passage on the initial motion of said vehicle whereby said second passage is operative on the actuation of said power brake control means to admit vacuum to said member and apply said brakes, resilient means operable to actuate said second valve to open said passage to said port when said vehicle stops whereby said brakes are held applied.

14. In a system of the class described, an automotive vehicle having a motor with an intake system and a power operated braking system, said power brake system having a pressure responsive member and a control means for admitting vacuum to said member, means providing a passage between said member and said intake system, means operative upon idling of the motor to open said passage and operative when said motor is accelerated to close said passage and vent same to atmosphere, means operative when said vehicle attains motion to close said passage from said intake system and operative to open said passage to said intake system as said vehicle stops, and means operative while said vehicle is in motion to admit vacuum to said member on the actuation of aforesaid vacuum brake control means.

15. In a brake system for an automotive vehicle equipped with an engine and a control for said engine, brakes, power means for the operation of the brakes, means operable for controlling said power means while the engine is running in speeds above idling speeds, means for thereafter holding the brakes applied by said power means when the engine is idling and the engine control is released, and means for making said holding means ineffective upon actuation of said engine control means.

16. For an automotive vehicle, an engine provided with a mechanism supplying oil pressure, a speed control comprising an accelerator pedal for said engine, road wheels, brakes for said road wheels, a means supplying fluid power, a fluid operated power cylinder having a movable member acted on by said fluid power, means for connecting said movable member with said brakes, a brake control including a valve for controlling the operation of said power cylinder, means comprising another valve controlled by said oil pressure for holding the brakes applied by the power cylinder when the accelerator pedal is released when the motor is running.

RALPH S. WHITTINGTON.